(No Model.)

E. E. EDGERTON.
ANTI FRICTION BEARING FOR ROLLER SKATES.

No. 318,237. Patented May 19, 1885.

Witnesses:
Chas. E. Gaylord.
L. M. Freeman.

Inventor:
E. E. Edgerton.
By L. B. Coupland & Co.
attys.

UNITED STATES PATENT OFFICE.

EDWARD E. EDGERTON, OF CHICAGO, ILLINOIS.

ANTI-FRICTION BEARING FOR ROLLER-SKATES.

SPECIFICATION forming part of Letters Patent No. 318,237, dated May 19, 1885.

Application filed July 15, 1884. (No model.)

*To all whom it may concern:*

Be it known that I, EDWARD E. EDGERTON, of Chicago, county of Cook, and State of Illinois, have invented certain new and useful Improvements in Anti-Friction Bearings for Roller-Skates, of which the following is a full, clear, and exact description, that will enable others to make and use the same, reference being had to the accompanying drawings, forming a part of this specification.

The object of this invention is to provide an improved axle-bearing for roller-skates, for the purpose of diminishing the friction of the spindle in the box.

Figure 1:
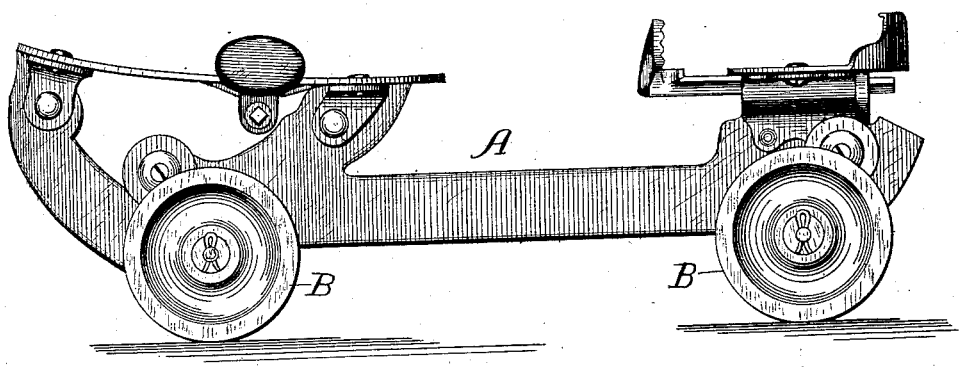
Figure 2:
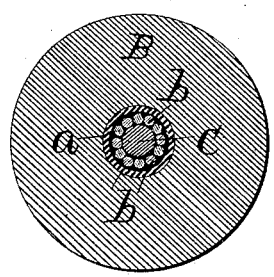
Figure 3:
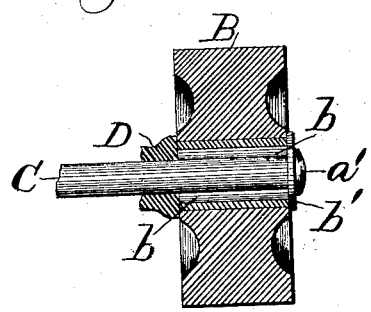

Figure 1 is a side elevation of a roller-skate embodying my improved feature; Fig. 2, a transverse section of one of the roller-wheels, axle, and bearing; and Fig. 3 a longitudinal section.

Referring to the drawings, A represents the foot-piece, which is of the ordinary construction; B, the roller-wheels upon which the skate is propelled, and C the axle.

As all the roller-wheels on the skate are provided with the same bearing alike, but one will be described.

In carrying out my improvement an annular space is left between the box $a$ in the roller-wheel B and the axle C. This space is then filled by a number of small steel rollers, $b$, loosely inserted and arranged in regular order around the axle, as shown in Fig. 2. The series of friction-rollers being loosely inserted, they are adapted to revolve in the annular chamber of the box, which arrangement has a tendency to greatly lessen the friction of the bearing parts and to impart to the axle more of a rolling contact than a frictional one. The outer or spindle end of the axle is provided with the flanged head $a'$, between which and the outer end of the axle-box is interposed the washer $b'$, inclosing this end of the axle-box and keeping the friction-rollers in place.

On the inside of the roller-wheel, and on the axle C, is placed the adjustable collar D, which is adapted to close the inner end of the bearing. By shifting this collar along on the axle access may be had to the box for the insertion or removal of the series of friction-rollers. This form of a bearing greatly reduces the wear on the revolving parts, and enables the bearings to be removed or repaired with the greatest facility.

Great trouble and inconvenience have been experienced in constructing or devising a durable and easy-running bearing for this class of inventions, as they are necessarily subjected to rough usage, and ordinarily require constant repairs to the running parts.

Having thus described my invention, what I claim as new, and desire to secure by Letters Patent, is—

In a roller-skate, the combination, with the axle C, provided on the outer end with the flanged head $a'$, of the washer $b'$, the series of friction-rollers $b$, the journal-box $a$, and the adjustable collar D, all combined, arranged, and operating substantially as and for the purpose set forth.

EDWARD E. EDGERTON.

Witnesses:
L. M. FREEMAN,
V. STANWOOD.